March 9, 1948. R. D. STRYKER 2,437,622
SKID RUNNER ATTACHMENT FOR VEHICLES
Filed Oct. 3, 1945

INVENTOR.
ROBERT D. STRYKER
BY
George W. Saywell
ATTORNEY

Patented Mar. 9, 1948

2,437,622

UNITED STATES PATENT OFFICE 2,437,622

SKID RUNNER ATTACHMENT FOR VEHICLES

Robert D. Stryker, Collins, Ohio

Application October 3, 1945, Serial No. 620,024

3 Claims. (Cl. 280—13)

1

The invention relates to skid runner attachments for vehicles, and particularly to devices of this character which are readily applied to and removed from the vehicle, which are securely locked to the vehicle when in use so as not to be jarred out of position, which are economically manufactured, and which are adaptable to vehicles of varying wheel and tire sizes.

The principle of the invention is herein illustrated by a description and showing of a form thereof, which is serviceable to provide a skid runner for small and/or light vehicles such as carts, baby buggies, farm wagons, etc.

The annexed drawings and the following description set forth in detail certain means illustrating the invention in skid runner attachments, such means disclosing, however, only one of the various forms in which the principle of the invention may be embodied.

Figure 1:
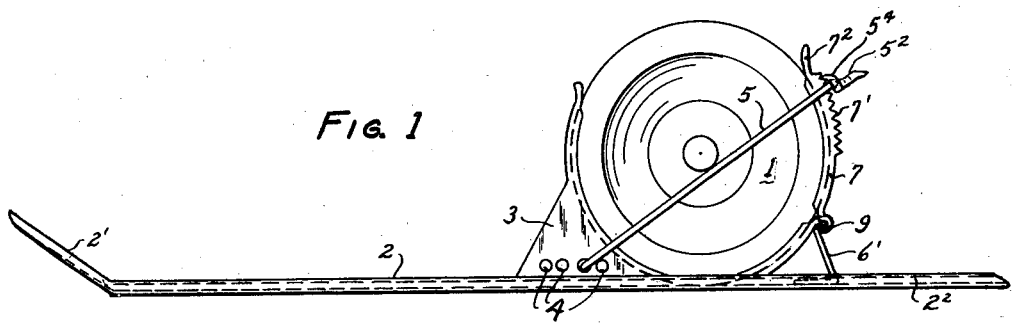
Figure 1 is a side elevation of a form of my improved skid runner attachment mounted on the wheel of a small vehicle such as a baby buggy.

Referring to the annexed drawings in which the same parts are indicated by the same respective numbers in the several views, a form of the invention is shown in the figures which is adaptable to small and/or light vehicles. A wheel 1 of such vehicle has attached therebeneath a skid runner attachment embodying the instant improvements. The skid runner 2 is of channel construction and has an angular upturned front end portion 2'. Welded between the upturned side portions 2² of the channel is an upwardly extended arcuate block 3 which forms the toe of a shoe for a vehicle wheel, the rear face of this toe 3 being of curved formation serving as an abutment 3' for the lower forward portion of the wheel 1. This toe member 3 is formed with a series of pairs of transversely aligned holes 4 adapted to receive the inturned opposed ends 5' of a U-shaped resilient clamping bar 5 whose closed U-end 5³ extends rearwardly and is adapted to be locked in any desirable tooth 7' formed upon the rear surface of a pivoted arcuate latch 7 hereinafter fully described. The clamping bar 5 is

2 formed with a rear end finger piece 5² rotatably mounted thereon and formed with a tooth-engaging dog 5⁴ and the latch 7 is formed with an upper end finger piece 7².

The latch 7 is pivoted at its lower end upon a pin 9 mounted in the upper end of an arcuate forwardly-extending bed 6 adjustably seated at its lower end by a forwardly-extending base portion 6² in the skid 2 between the channel side portions 2² thereof and serving as a heel to receive the rear lower portion of the wheel 1, the heel 6 being formed with a rear strut 6' also adjustably mounted between the channel side portions 2².

It is thus apparent that by reason of the adjustability of the rear wheel support 6—6', the forward and rearward bed members may be relatively adjusted to receive wheels of different diameters.

Figure 2:
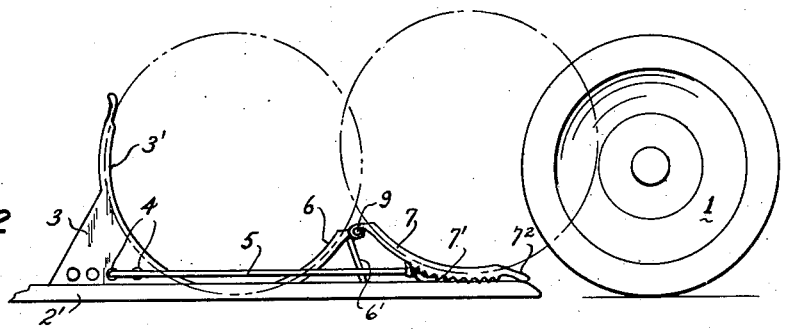
Figure 2 is a fragmentary side elevation illustrating an open position of the attachment in position to receive the vehicle, and the wheel of the vehicle about to be run thereonto.
Figure 3:
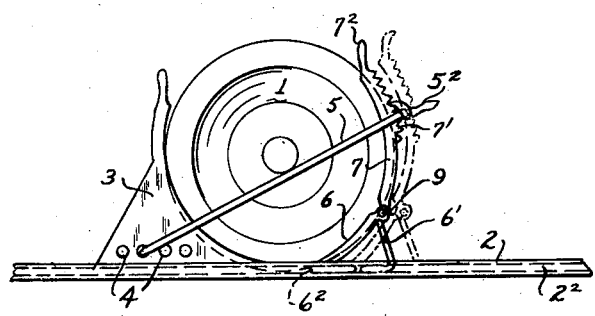
Figure 3 is a fragmentary side elevation, similar to Figure 1, but illustrating the adjustability of the attachment for wheels of different sizes.
Figure 4:
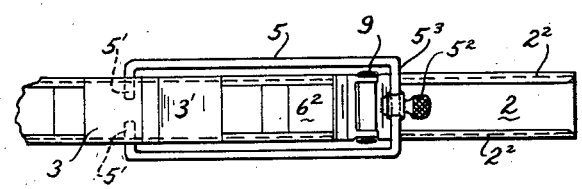
Figure 4 is a fragmentary plan of the attachment shown in Figure 1.

When it is desired to run a vehicle onto the skid attachment, the clamping bar 5 is dropped down to the position shown in Figure 2, and the latch 7 is turned down on the pin 9 to a position also shown in Figure 2, and then the wheel of the vehicle can be run up over the latch 7 and into the bed formed by the toe member 3 and the heel member 6, after which the latch 7 is turned on its pivot pin 9 into contact with the wheel 1 and locked into position by the clamping bar 5, the dog 5⁴ of which is engaged with that tooth 7' of the latch 7 which will effect a tight locking of the parts.

The clamping bar 5 can be mounted in any desired one of the holes 4 whereby to provide latitude for proper locking of the size of wheel of the vehicle which is being served, in addition to the adjustment which is afforded by the slidable mounting of the heel member 6 and the strut member 6' longitudinally of the skid side members 2².

What I claim is:

1. A skid runner attachment for vehicles comprising a runner formed to provide a mounting for a vehicle wheel, the mounting comprising a toe portion and a heel portion, the toe portion being welded to and extended upwardly from the runner, a strut mounted on the runner, the heel portion of the mounting being supported by the strut, a wheel-engaging latch pivotally secured to the heel portion, and a U-shaped clamping bar adjustably pivotally mounted at one end in the toe portion, the latch being formed with a plurality of teeth with which the other end of the clamping bar selectively engages.

2. A skid runner attachment for vehicles comprising a runner formed to provide a mounting for a vehicle wheel, the mounting comprising a toe portion and a heel portion, a wheel-engaging latch pivotally secured to the heel portion and formed to provide an arcuate wheel-rolling and wheel-engaging surface, the latch effecting in one pivotal position its latching function and in another pivotal position a runway for movement of the wheel into its mounting, the surface of the latch opposite its wheel-rolling and wheel-engaging surface being formed with a succession of teeth, and clamping means for the latch supported on the mounting and engageable with a selective tooth of the latch.

3. A skid runner attachment for vehicles comprising a runner formed to provide a mounting for a vehicle wheel, the mounting comprising a toe portion and a heel portion, means for relatively adjusting the toe and heel portions, a wheel-engaging latch pivotally secured to the heel portion and formed to provide an arcuate wheel-rolling and wheel-engaging surface, the latch effecting in one pivotal position its latching function and in another pivotal position a runway for movement of the wheel into its mounting, the surface of the latch opposite its wheel-rolling and wheel-engaging surface being formed with a succession of teeth, and clamping means for the latch supported on the mounting and adjustable for engagement with a selective tooth of the latch and for wheels of different sizes.

ROBERT D. STRYKER.

REFERENCES CITED

The following references are of record in the file of this patent:

UNITED STATES PATENTS

| Number | Name | Date |
| --- | --- | --- |
| 767,907 | Meyer | Aug. 16, 1904 |
| 878,259 | Walsh | Feb. 4, 1908 |
| 1,261,751 | Brintnell | Nov. 4, 1941 |
| 1,359,254 | Krupsky | Nov. 16, 1920 |
| 1,363,148 | Morse | Dec. 21, 1920 |